J. W. DAVIS.
GATE HINGE.
APPLICATION FILED OCT. 6, 1915.
1,184,629.  Patented May 23, 1916.
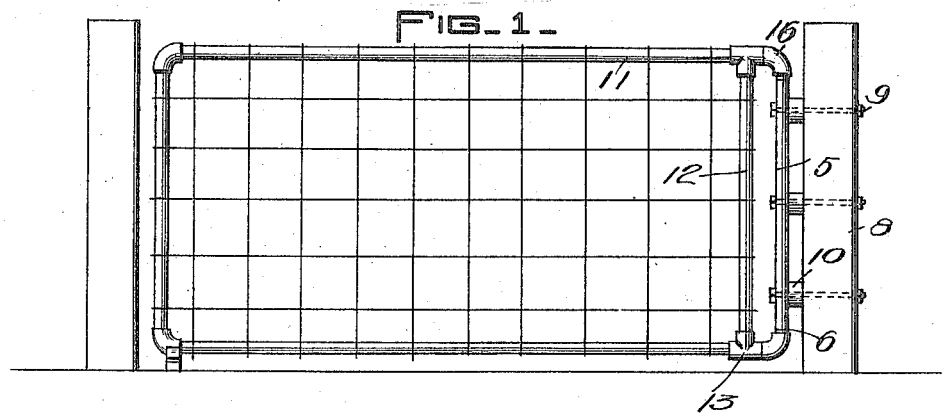
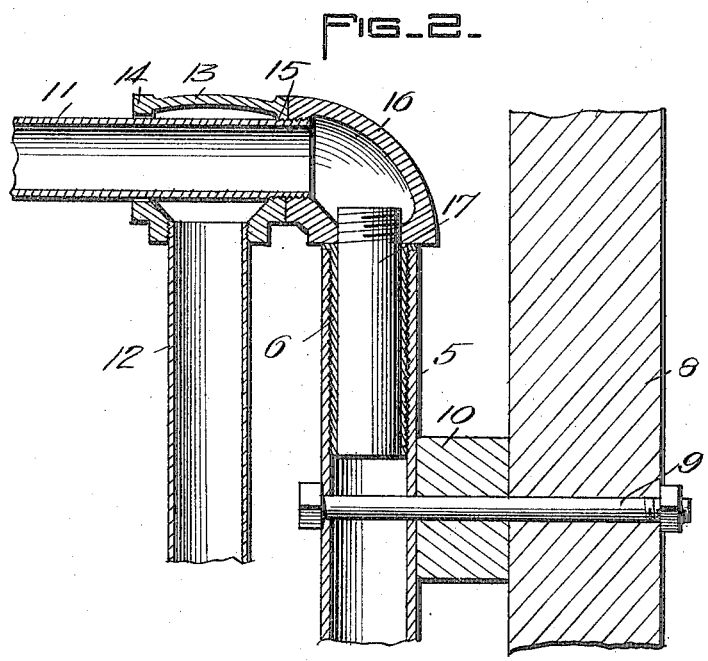
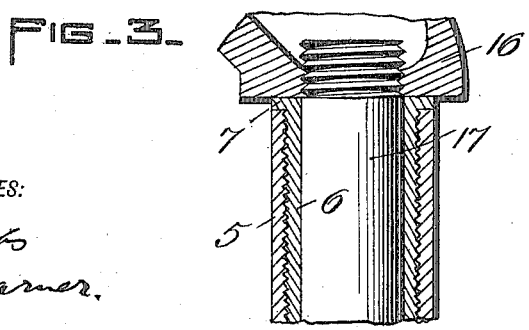
WITNESSES:
INVENTOR
James W. Davis,
BY Munn & Co.
ATTORNEYS

UNITED STATES PATENT OFFICE.

JAMES W. DAVIS, OF WEST TERRE HAUTE, INDIANA.

GATE-HINGE.

1,184,629. Specification of Letters Patent. Patented May 23, 1916.

Application filed October 6, 1915. Serial No. 54,360.

*To all whom it may concern:*

Be it known that I, JAMES W. DAVIS, a citizen of the United States, and a resident of West Terre Haute, in the county of Vigo and State of Indiana, have invented a certain new and useful Improvement in Gate-Hinges, of which the following is a specification.

One of the principal objects of my invention is to provide an improved gate hinge formed preferably of pipe sections and fittings, in which strength and paucity of parts are combined with simplicity and beauty of design.

With these and other objects in view, which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a view in side elevation of a gate showing the same mounted upon a hinge constructed according to my invention. Fig. 2 represents a fragmentary view in section taken vertically through the hinge and a portion of the gate. Fig. 3 represents an enlarged view of a portion of Fig. 2.

In carrying out my invention, I provide a hinge including a pipe length 5 which forms a standard, and which at each end is internally threaded to receive an externally threaded bushing 6, which latter has its outer ends provided with an outwardly extending flange 7 overlapping the adjacent end of the pipe section or standard 5. The standard may be secured to a gate post indicated at 8, through the medium of bolts 9 which extend through openings provided in the standard, and through openings provided in spacer blocks 10 and through the post.

The gate as shown in the drawing constitutes a wire covered frame consisting of a number of pipe lengths connected by suitable unions. The upper and lower rails of the gate are shown at 11, and the inner rail or stile at 12. The latter is connected with the upper and lower rails through the medium of T-unions 13. The latter at their inner portions 14 are smooth, while at their outer ends are interiorly threaded as at 15, to turn upon the outer threaded ends of the rails 11. The movable members of the hinge are carried each by one of the rails 11, and constitute each an elbow 16 by which a pin 17 is supported. One end of the elbow 16 is turned upon the outer threaded end of rail 11 into engagement with the T-union 13. Into the opposite end of the elbow is turned the inner threaded end of the pin 17. A hollow pipe section may be used in place of the pin if so desired. Preferably the pin is formed of a length of cold rolled shafting or other suitable hardened material. When the device is in assembled position, pin 17 rotatably extends within the bearing 6, and the lower end of elbow 16 bears against the flange 7 of the bushing. The pipe length 12 is provided with right and left hand threads at its opposite ends so as to draw the T's 13 together with the adjacent portions of the hinge and gate into properly assembled positions. The pipe section 12 thus serves as means upon which the wire may be stretched, and also as means for retaining the hinge portions in correct position. If the bearing formed between the elbows and the bushings become loose, or if they are too tight, the proper adjustment may be obtained by turning the pipe 12 in one direction or the other.

Although I have described the preferred embodiment of my invention, I may desire to make such changes in the construction, combination, and arrangement of parts thereof, as do not depart from the spirit of the invention and the scope of the appended claims.

I claim:—

1. The combination of a gate including top and bottom rails, threaded at their ends, T-unions arranged upon the rails and being turned at their outer portions upon the threaded ends thereof, an end rail connecting the T-unions and having oppositely threaded portions turned into engagement with said unions, a hollow standard, means for rigidly connecting said standard to a gate post, said standard having internally threaded ends, bushings turned into engagement with the threaded ends of the standard and having outwardly extending flanges overhanging the ends of said standard, an elbow turned upon the outer end of each of the first said rails into engagement with one of the T-unions, and a pin of hardened material carried by each elbow and rotatably engaging within the adjacent bushing, said elbows at their inner ends bearing against the outwardly extending flanges of said bushings.

2. The combination of a gate including top and bottom rails, means connecting said rails adjacent their inner ends whereby they may be shifted toward and away from each other, an elbow carried by each rail, a standard, means whereby said standard may be rigidly secured to a gate post, a bushing supported at each end of the standard, and a hardened pin carried by each elbow and rotatably extending into one of the bushings, said elbows at their inner ends bearing against said bushings for rotation thereon.

3. The combination of a gate, a standard, means for rigidly securing said standard to a gate post, bushings carried by the standard adjacent the ends thereof, said bushings being provided with outwardly extending flanges, an elbow carried by each of the top and bottom rails of the gate, and a pivot pin carried by each elbow and rotatably extending each into one of the bushings, said elbows adapted to bear against the outwardly extending flanges of said bushings.

4. A hinge including a hollow standard, means for securing the same rigidly to a gate post, means for spacing the standard from said post, a bushing carried interiorly of the standard at each end thereof, a pin arranged for rotation within each bushing, and an elbow carried by each pin and engaging against the adjacent bearing and adapted to be connected with a gate.

JAMES W. DAVIS.

Witnesses:
J. A. JUERGENS,
COOPER BLACK.

Copies of this patent may be obtained for five cents each, by addressing the "Commissioner of Patents, Washington, D. C."